(12) United States Patent
Guo

(10) Patent No.: US 8,223,421 B2
(45) Date of Patent: Jul. 17, 2012

(54) SHUTTER AND CAMERA MODULE HAVING SAME

(75) Inventor: Ming-Lung Guo, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 40 days.

(21) Appl. No.: 12/949,800

(22) Filed: Nov. 19, 2010

(65) Prior Publication Data
US 2012/0050837 A1    Mar. 1, 2012

(30) Foreign Application Priority Data
Aug. 27, 2010 (TW) .............................. 99128720 A

(51) Int. Cl.
*G02B 26/02* (2006.01)
(52) U.S. Cl. ........................................ 359/228; 396/452
(58) Field of Classification Search .................. 359/228; 396/452, 457
See application file for complete search history.

(56) References Cited

U.S. PATENT DOCUMENTS
2008/0174846 A1*   7/2008   Morozumi et al. ........... 359/228
* cited by examiner

*Primary Examiner* — James Phan
(74) *Attorney, Agent, or Firm* — Altis Law Group, Inc.

(57) ABSTRACT

A shutter includes a first insulating substrate, a first electrode layer, a second insulating substrate, a second electrode layer, and a light-blocking layer. The first electrode layer is formed on the first insulating substrate. The first electrode layer includes layer portions insulated from one another. The second electrode layer is formed on the second insulating substrate. The light-blocking layer is disposed between the first and second electrode layers. The light-blocking layer includes a liquid and opaque and charged balls movably distributed in the liquid. At least one layer portion is selected. The at least one selected layer portion and the second electrode layer are connected to respective positive voltage and negative voltage to generate an electric field to the charged balls. The charged balls are attracted by the electric field to arrange in a configuration corresponding to the at least one selected layer portion to block light.

18 Claims, 11 Drawing Sheets

SHUTTER AND CAMERA MODULE HAVING SAME

BACKGROUND

1. Technical Field

The disclosure generally relates to image capture, and particularly, to a camera module and a shutter thereof.

2. Description of Related Art

In recent years, camera modules have been incorporated into mobile devices, such as mobile phones and laptop computers. Most such devices are progressively becoming smaller over time, and digital camera modules, which are equipped with mechanical shutters, are experiencing a corresponding reduction in size. However, a typical mechanical shutter generally includes a motor, a drive shaft, a spring, and some other components. Thus, such mechanical shutter has relatively large size, and it is difficult to minimize the size of such shutters and the camera modules which equipped with the shutters.

Therefore, what is needed is a shutter and a camera module that can overcome the described limitations.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

The shutter and camera module as disclosed will now be described in detail below and with reference to the drawings.

Figure 1:
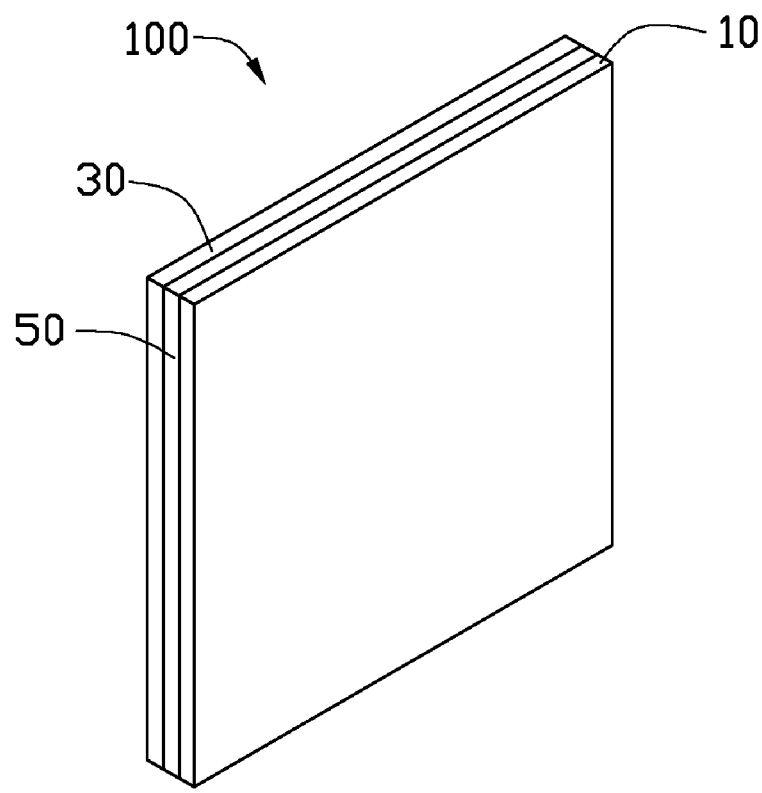
FIG. 1 is an isometric view of one embodiment of a shutter.
Figure 2:
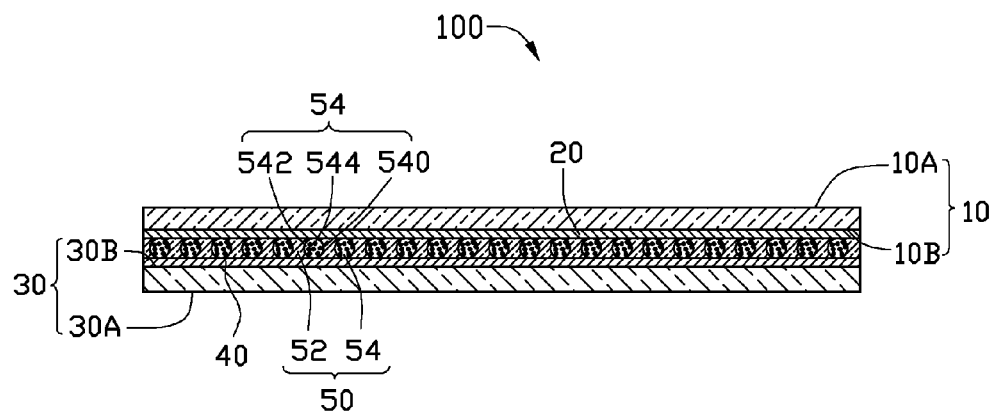
FIG. 2 is a cross section of the shutter of FIG. 1.

Referring to FIGS. 1 and 2, one embodiment of a shutter 100 includes a first insulating substrate 10, a first electrode layer 20, a second insulating substrate 30, a second electrode layer 40, and a light-blocking layer 50.

The first insulating substrate 10 can be light-pervious material, such as polyethylene terephthalate (PET), or other suitable insulating material. In this embodiment, the first insulating substrate 10 is planar and substantially rectangular. The first insulating substrate 10 includes a top surface 10A and a first surface 10B at opposite sides thereof. The first electrode layer 20 is formed on the first surface 10B. In this embodiment, the first electrode layer 20 can be indium tin oxide (ITO). In alternative embodiments, the first electrode layer 20 can be indium zinc oxide (IZO), or other suitable conducting material. In addition, the first electrode layer 20 can be substantially circular.

Figure 3:
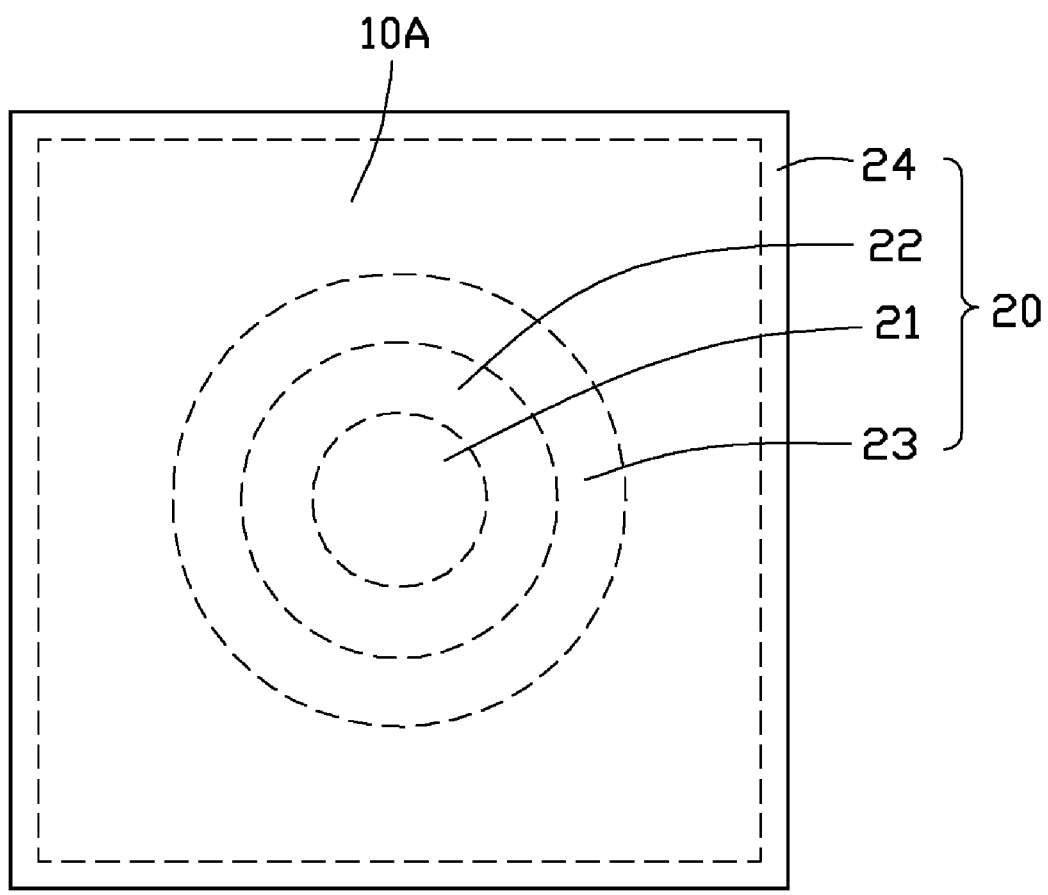
FIG. 3 is a top plan view of the shutter of FIG. 1.

Referring also to FIG. 3, the first electrode layer 20 includes a first layer portion 21, a number of second layer portions 22, 23, and a third layer portion 24. The first, the second, and the third layer portions 21, 22, 23 are insulated from one another. In this embodiment, the first layer portion 21 is substantially circular, and is formed on a central portion of the first surface 10B. The first electrode layer 20 includes two second layer portions 22, 23. The two second layer portions 22, 23 are concentric. Each of the second layer portions 22, 23 is substantially annular. The second layer portion 22 surrounds the first layer portion 21. The other second layer portion 23 faces away from the first layer portion 21, and surrounds the second layer portion 22. The third layer portion 24 is formed on an edge portion of the first surface 10B, and surrounds the second layer portion 23. In this embodiment, the third layer portion 24 is rectangular frame-shaped. In alternative embodiments, the first electrode layer 20 may be of any other suitable configuration.

The second insulating substrate 30 can be light-pervious material, such as glass, or other suitable insulating material. The second insulating substrate 30 is spaced from the first insulating substrate 10 by the light-blocking layer 50. In this embodiment, the second insulating substrate 30 is substantially parallel to the first insulating substrate 10. A shape of the second insulating substrate 30 is similar to that of the first insulating substrate 10. That is, the second insulating substrate 30 can be planar and rectangular or circular. The second insulating substrate 30 includes a bottom surface 30A and a second surface 30B at opposite sides thereof. The second surface 30B is oriented toward the first surface 10B. The bottom surface 30A is located at a side of the second insulating substrate 30 facing away from the first insulating substrate 10.

The second electrode layer 40 is arranged on the second surface 30B. In this embodiment, the second electrode layer 40 is uniformly formed on the second surface 30B of the second insulating substrate 30. The second electrode layer 40 can be zinc selenide (ZnSe) or six lanthanum boride (LaB6).

The light-blocking layer 50 is arranged between the first electrode layer 20 and the second electrode layer 40. As shown in FIG. 2, the light-blocking layer 50 includes a dielectric liquid 52 and a number of charged balls 54 movably distributed in the liquid 52. The liquid 52 is light-pervious. Each of the charged balls 54 includes a microcapsule 540, a fluid 542 contained in the microcapsule 540, and a number of charged black particles 544. The microcapsule 540 is substantially spherical. The charged black particles 544 are suspended in the fluid 542. The fluid 542 in the charged ball 54 can be organic material or inorganic material.

In this embodiment, as shown in FIG. 2, the charged balls 54 are distributed on a single layer, and contact the first electrode layer 20 and the second electrode layer 40. The black particle 544 can be opaque material, such as negatively charged carbon black. In alternative embodiments, the black particle 544 can be positively charged carbon black. The charged balls 54 may be overlapped or stacked, and contacting one another.

In operation, at least one of the first, the second, and the third layer portions 21, 22, 23, 24 can be selectively connected to a positive terminal of a power supply (not shown), thus serving as positive electrode. The second electrode layer 40 can be connected to a negative terminal of the power supply, thus serving as negative electrode. When power is supplied, an electric field is connected to the charged black particles 544, the charged balls 54 containing the black particles 544 are attracted by electric field force to gather under for example, the first, the second, or the third layer portions 21, 22, 23, 24. In this embodiment, the black particles 544 gathering together under the first, the second, or the third layer portions 21, 22, 23, 24 can prevent light from passing through the corresponding first, the second, or the third layer portions 21, 22, 23, 24. In contrast, other layer portion allows light to pass therethrough.

Figure 4:
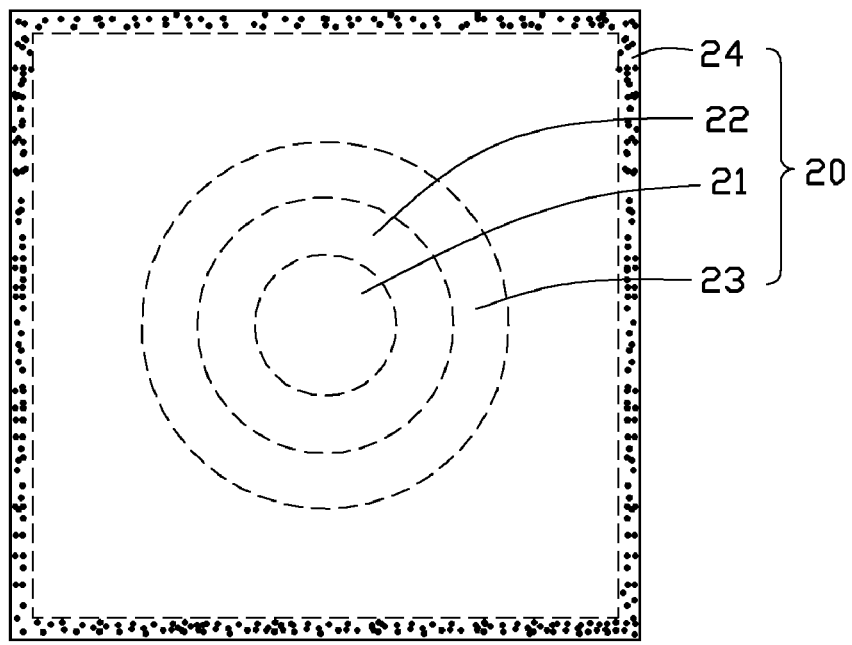
FIG. 4 is a schematic view of the shutter of FIG. 3 in a first operating state.

As shown in FIG. 4, in a first operating state of the shutter 100, a positive voltage is applied only to the third layer portion 24, and a negative voltage is connected to the second electrode layer 40. The charged balls 54 are attracted to gather under the third layer portion 24 to block light. The other layer portions, such as the first and the second layer portions 21, 22, 23 allow light to pass.

Figure 5:
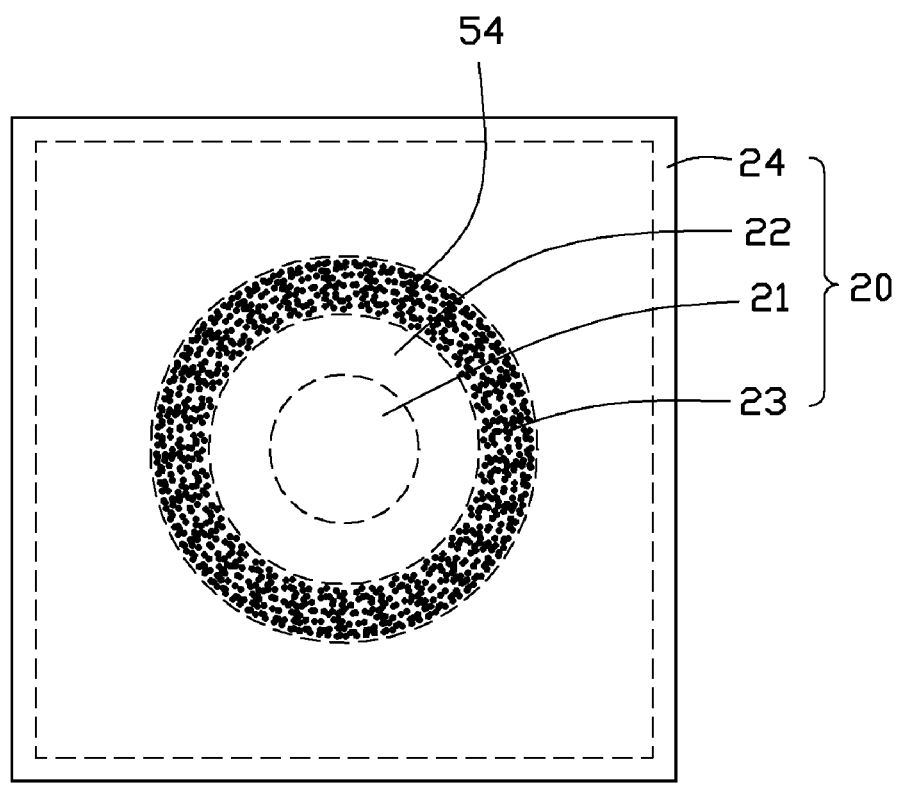
FIG. 5 is a schematic view of the shutter of FIG. 3 in a second operating state.

As shown in FIG. 5, in a second operating state of the shutter 100, the positive voltage is applied only to the second layer portion 23, and the negative voltage is connected to the second electrode layer 40. The charged balls 54 are attracted to gather under the second layer portion 23 and block light. The other layer portions, for example the first, the second, and the third layer portions 21, 22, 24 allow light to pass.

Figure 6:
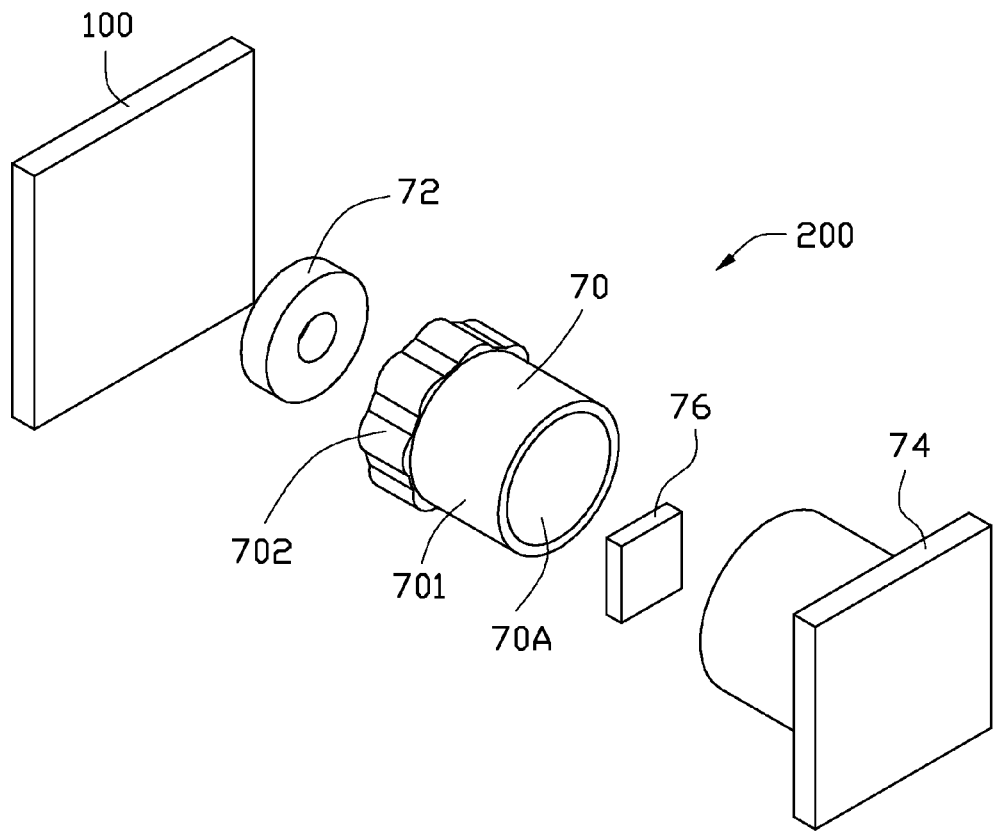
FIG. 6 is a disassembled view of one embodiment of a camera module.

Referring to FIG. 6, one embodiment of a camera module 200 is shown. The shutter 100 is installed in the camera module 200. In this embodiment, the camera module 200 includes the shutter 100, as well as a lens barrel 70, a lens 72, a holder 74, and an image sensor 76. The lens barrel 70 has a through hole 70A defined along an axis thereof for receiving the lens 72. In alternative embodiments, the camera module 200 may include a number of lenses 72, and the lenses 72 can also be received in the through hole 70A when in use.

Figure 7:
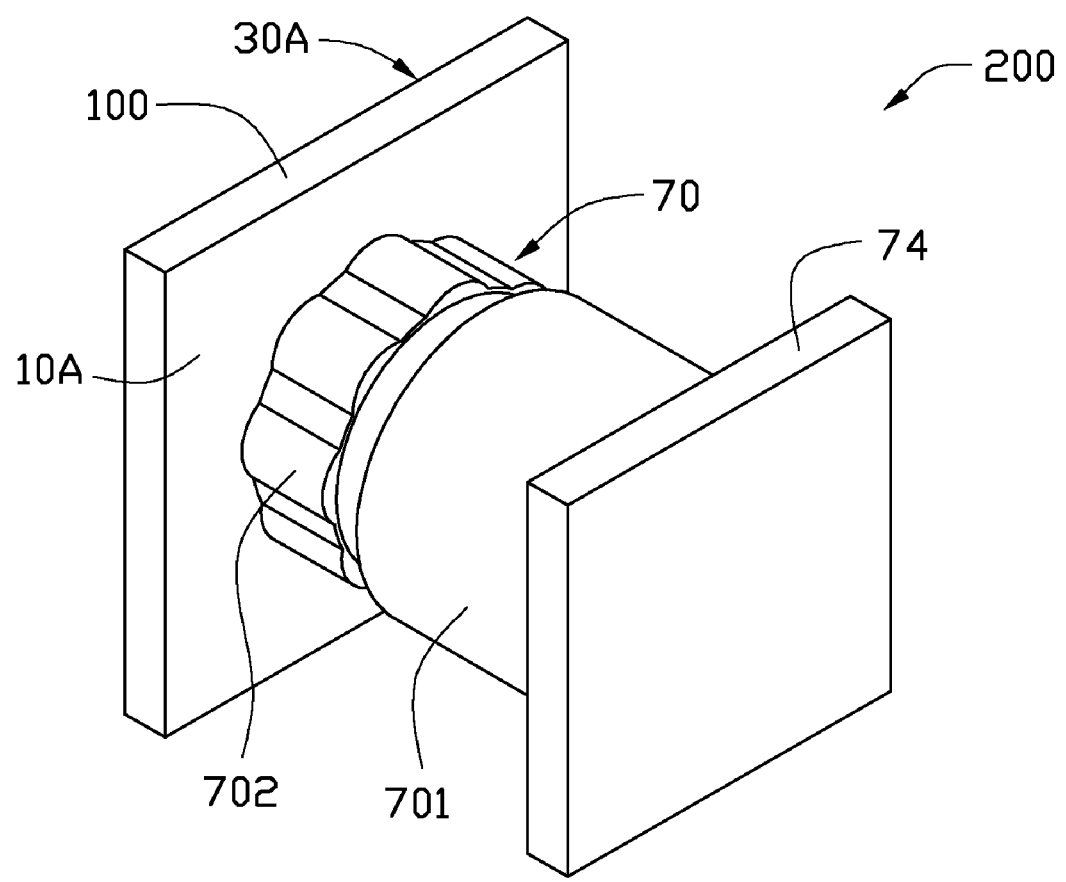
FIG. 7 is an assembled view of the camera module of FIG. 6.

As shown in FIG. 7, the lens 72 is received in the through hole 70A of the lens barrel 70 when the camera module 100 is assembled. The image sensor 76 is received in the holder 74. The lens barrel 70 is connected to the holder 74, thus the lens 72 are aligned with the image sensor 76. In this embodiment, the lens barrel 70 includes a first end 701 and an opposite second end 702. The first end 701 is connected to the holder 74. The second end 702 is distant from the holder 74 and attached to the shutter 100. The first insulating substrate 10 of the shutter 100 encloses the through hole 70A of the lens barrel 70. The top surface 10A of the first insulating substrate 10 (see FIG. 1) contacts an end surface of the second end 702. In alternative embodiments, the second insulating substrate 30 of the shutter 100 can enclose the through hole 70A. The bottom surface 30A of the second insulating substrate 30 contacts the end surface of the second end 702.

In this embodiment, the first and the second layer portions 21, 22, 23 are oriented toward the through hole 70A, and the through hole 70A serves as an aperture of the camera module 200. An outer diameter of the second layer portion 23 equals a diameter of the through hole 70A. The third layer portion 24 surrounds the through hole 70A. The charged balls 54 control the amount of light entering the through hole 70A and passing through the lens 72 to the image sensor 76.

In one example, when only the third layer portion 24 is connected to the positive voltage, the light entering the through hole 70A is not blocked by any charged ball 54, and passes through in its entirety.

Figure 8:
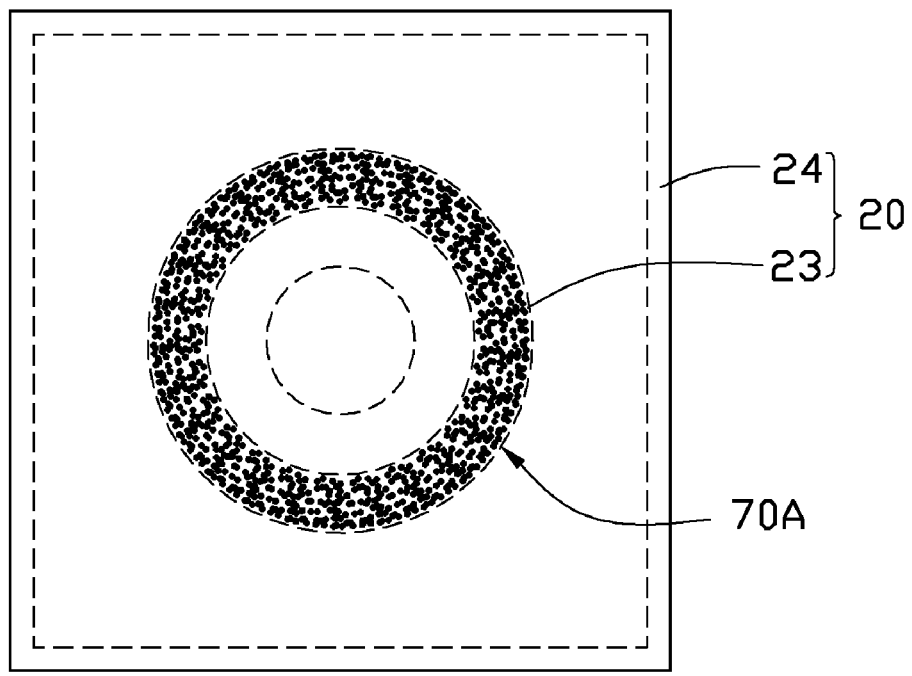
FIG. 8 is a schematic view of the camera module of FIG. 7 in a first operating state.
Figure 9:
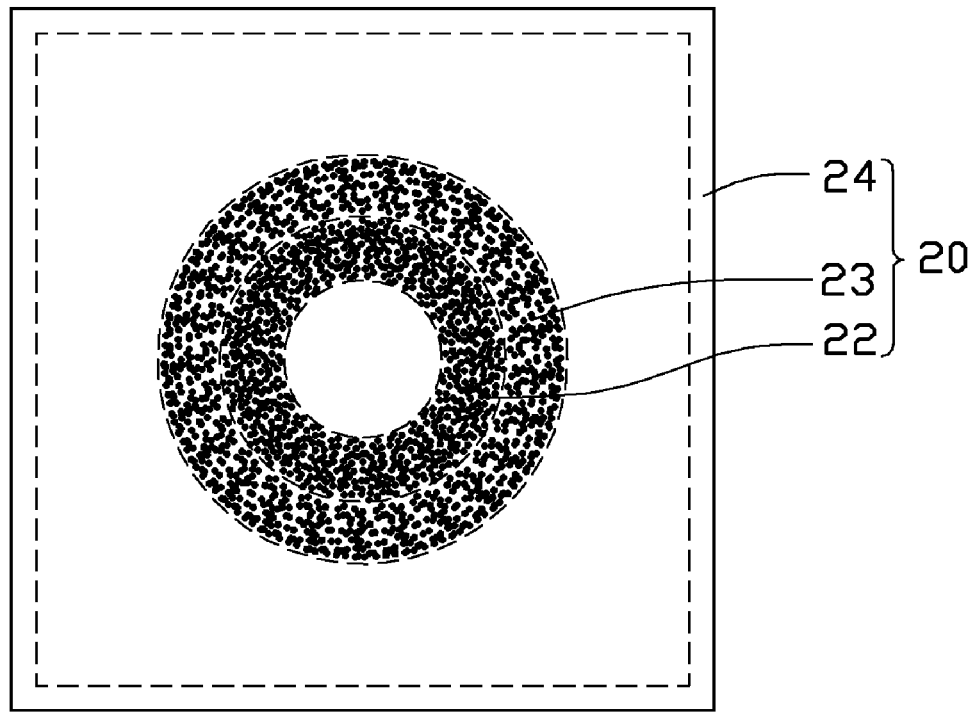
FIG. 9 is a schematic view of the camera module of FIG. 7 in a second operating state.

As shown in FIG. 8, when the camera module 200 is in a first operating state, only the second layer portion 23 is connected to the positive voltage. A portion of light entering through hole 70A is blocked by the charged balls 54 gathered under the second layer portion 23. Accordingly, less light enters the through hole 70A. Furthermore, as shown in FIG. 9, when the camera module 200 is in a second operating state, the other second layer portion 22 is also connected to the positive voltage. More light entering the through hole 70A is blocked by the charged balls 54 gathered under the two second layer portion 22, 23. Accordingly, less light enters the through hole 70A.

Figure 10:
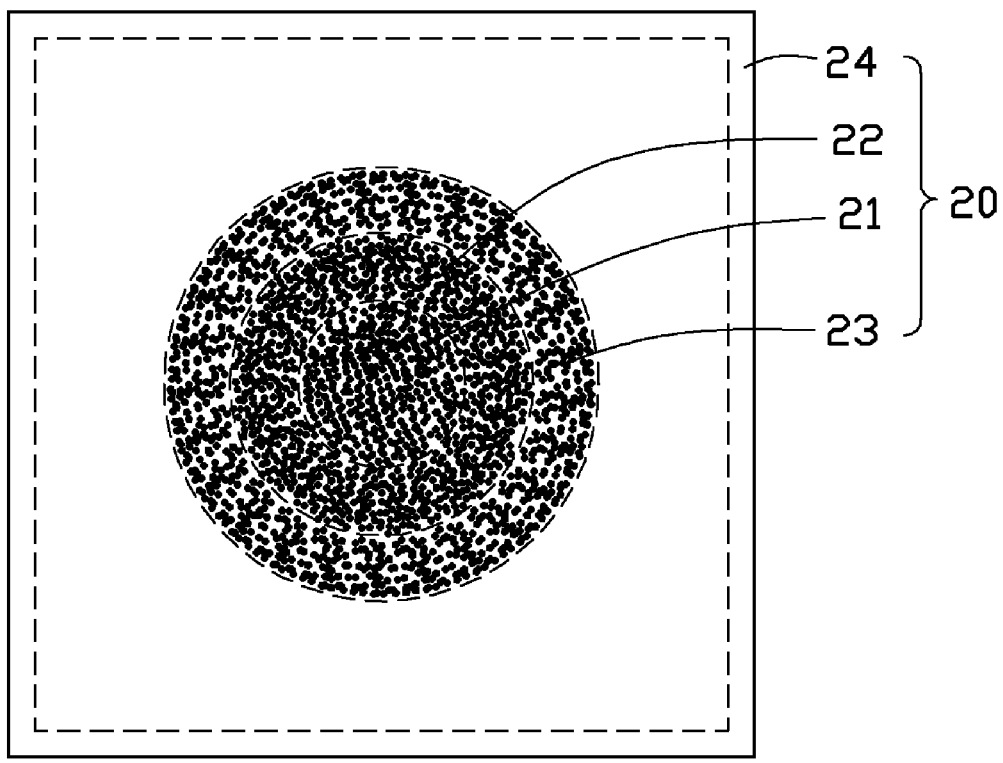
FIG. 10 is a schematic view of the camera module of FIG. 7 in a third operating state.

As shown in FIG. 10, when the camera module 200 is in a third operating state, the first layer portion 21 is also connected to the positive voltage, and all light is blocked by the charged balls 54, and no light can enter the through hole 70A.

Figure 11:
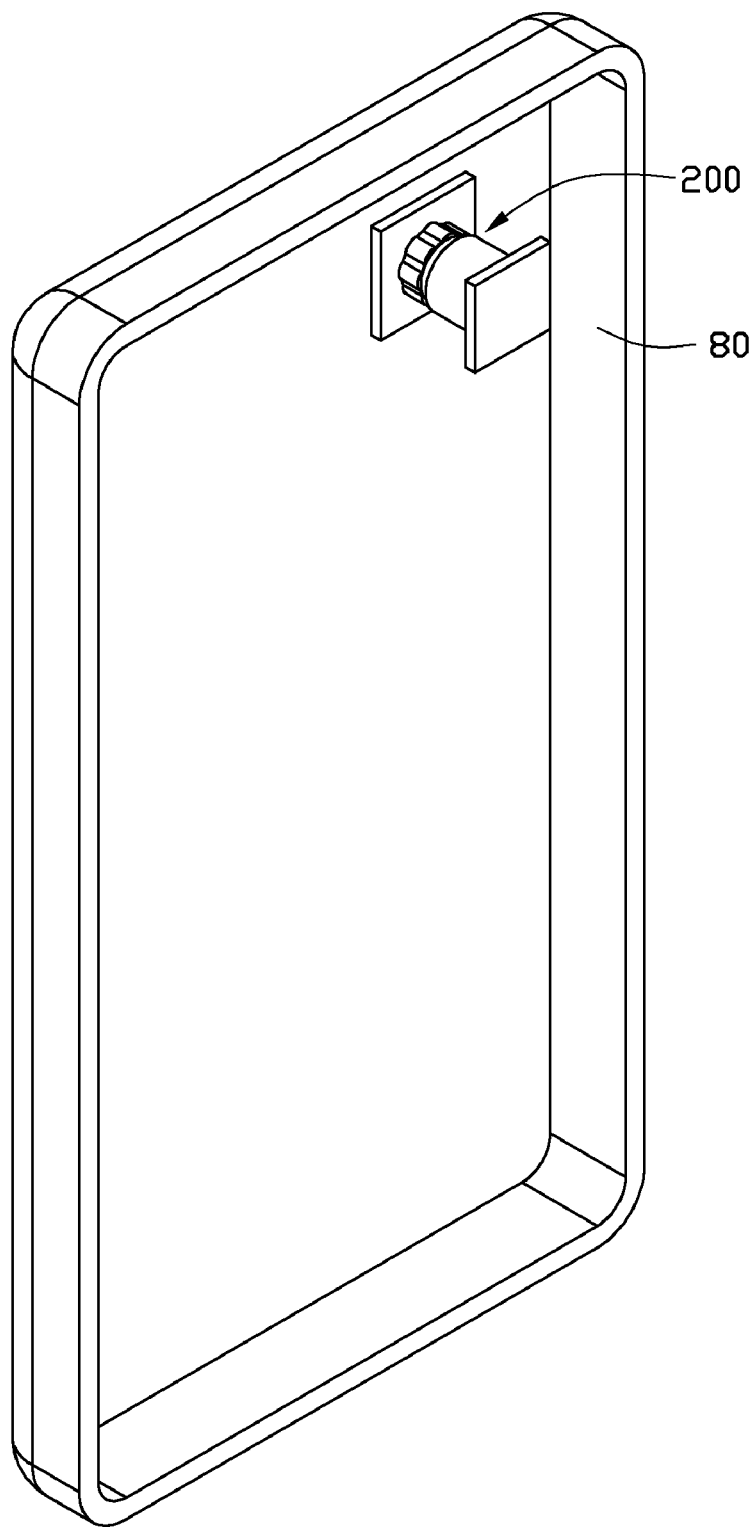
FIG. 11 is an isometric view of the camera module of FIG. 7, together with a shell of a mobile phone.

One advantage of the camera module 200 is that amount of light entering the through hole 70A can be controlled by arrangement of the charged balls 54 under for example, the first, the second, or the third layer portions 21, 22, 23, 24. Thus the camera module 200 having the shutter 100 is convenient to use, and the camera module 200 can be reduced in size far more than with a mechanical shutter. The camera module 200 can accordingly be provided in, for example, a mobile phone (see FIG. 11, a shell 80 of the mobile phone is shown) of small proportions.

It is understood that the description is intended to illustrate rather than limit the disclosure. Variations may be made to the embodiments without departing from the spirit of the disclosure. Accordingly, it is appropriate that the appended claims be construed broadly and in a manner consistent with the scope of the disclosure.

What is claimed is:

1. A shutter comprising:
a first insulating substrate having a first surface;
a first electrode layer positioned on the first surface, the first electrode layer comprising a plurality of layer portions insulated from one another;
a second insulating substrate having a second surface oriented toward the first surface;
a second electrode layer positioned on the second surface; and
a light-blocking layer positioned between the first electrode layer and the second electrode layer, the light-blocking layer comprising a light-pervious liquid, and a plurality of opaque and charged balls movably distributed in the liquid, at least one layer portion of the first electrode layer being selected, the at least one selected layer portion and the second electrode layer being connected to respective positive voltage and negative voltage, such that the at least one selected layer portion and the second electrode layer cooperatively apply an electric field to the charged balls and attract the charged balls to arrange in a configuration corresponding to the at least one selected layer portion, thus blocking light therethrough.

2. The shutter of claim 1, wherein each of the charged balls comprises a microcapsule, a fluid contained in the microcapsule, and a plurality of charged black particles suspended in the fluid.

3. The shutter of claim 2, wherein the charged black particles comprise negatively charged carbon blacks.

4. The shutter of claim 1, wherein the first electrode layer comprises a circular first layer portion, a plurality of annular second layer portions, and a rectangular frame-shaped third layer portion, the first layer portion is positioned on a central portion of the first surface, the second layer portions are concentric and surround the first layer portion in sequence around the first layer portion, the third layer portion is positioned on an edge portion of the first surface and surrounds the second layer portions.

5. The shutter of claim 1, wherein the first insulating substrate is made of polyethylene terephthalate.

6. The shutter of claim 1, wherein the second insulating substrate is made of glass.

7. The shutter of claim 1, wherein the first electrode layer is made of indium tin oxide.

8. The shutter of claim 1, wherein the second electrode layer is made of one of zinc selenide and six lanthanum boride.

9. A camera module comprising:
at least one lens;
a lens barrel with a through hole receiving the at least one lens;
an image sensor aligned with the lenses; and
a shutter attached to an end of the lens barrel, the shutter comprising:
a first insulating substrate having a first surface;
a first electrode layer positioned on the first surface, the first electrode layer comprising a plurality of layer portions insulated from one another;
a second insulating substrate having a second surface;
a second electrode layer positioned on the second surface; and
a light-blocking layer positioned between the first electrode layer and the second electrode layer, the light-blocking layer comprising a light-pervious liquid, and a plurality of opaque and charged balls movably distributed in the liquid, at least one layer portion of the first electrode layer and the second electrode layer capable of cooperatively generating an electric field to the charged balls and attract the charged balls to arrange in a configuration corresponding to the at least one selected layer portion, thus blocking light through the through hole of the lens barrel.

10. The camera module of claim 9, wherein one of the first insulating substrate and the second insulating substrate is attached to the barrel and encloses the through hole of the lens barrel.

11. The camera module of claim 10, wherein the first electrode layer comprises a circular first layer portion, a plurality of annular second layer portions, and a rectangular frame-shaped third layer portion, the first layer portion is positioned on a central portion of the first surface, the second layer portions are concentric and surround the first layer portion in sequence around the first layer portion, the third layer portion is positioned on an edge portion of the first surface and surrounds the second layer portions.

12. The camera module of claim 11, wherein the largest outer diameter of the second layer portions is equal to a diameter of the through hole.

13. The camera module of claim 9, wherein each of the charged balls comprises a microcapsule, a fluid contained in the microcapsule, and a plurality of charged black particles suspended in the fluid.

14. The camera module of claim 13, wherein the charged black particles comprise negatively charged carbon blacks.

15. The camera module of claim 9, wherein the first insulating substrate is made of polyethylene terephthalate.

16. The camera module of claim 9, wherein the second insulating substrate is made of glass.

17. The camera module of claim 9, wherein the first electrode layer is made of indium tin oxide.

18. The camera module of claim 9, wherein the second electrode layer is made of one of zinc selenide and six lanthanum boride.

* * * * *